(12) United States Patent
Ooba

(10) Patent No.: US 10,850,570 B2
(45) Date of Patent: Dec. 1, 2020

(54) PNEUMATIC TIRE

(71) Applicant: BRIDGESTONE CORPORATION, Tokyo (JP)

(72) Inventor: Hiroshi Ooba, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 236 days.

(21) Appl. No.: 15/776,510

(22) PCT Filed: Oct. 13, 2016

(86) PCT No.: PCT/JP2016/080359
§ 371 (c)(1),
(2) Date: May 16, 2018

(87) PCT Pub. No.: WO2017/090332
PCT Pub. Date: Jun. 1, 2017

(65) Prior Publication Data
US 2018/0345733 A1 Dec. 6, 2018

(30) Foreign Application Priority Data
Nov. 24, 2015 (JP) .................. 2015-228382

(51) Int. Cl.
*B60C 11/04* (2006.01)
*B60C 11/117* (2006.01)
(Continued)

(52) U.S. Cl.
CPC .......... *B60C 11/1218* (2013.01); *B60C 11/03* (2013.01); *B60C 11/0323* (2013.01);
(Continued)

(58) Field of Classification Search
CPC ............... B60C 11/1392; B60C 11/042; B60C 11/1281; B60C 11/032; B60C 11/0323; B60C 11/1384
See application file for complete search history.

(56) References Cited

U.S. PATENT DOCUMENTS 2,298,033 A  10/1942  Bowers et al.
2,322,505 A   6/1943  Bull
(Continued)

FOREIGN PATENT DOCUMENTS

JP   51-22255 A    7/1976
JP   2000-016026 A  1/2000
(Continued)

OTHER PUBLICATIONS

Machine Translation: JP-2008296858-A, Tanno, Atsushi, (Year: 2020).*
(Continued)

*Primary Examiner* — Kendra Ly
(74) *Attorney, Agent, or Firm* — Sughrue Mion, PLLC

(57) ABSTRACT

A pneumatic tire has a tread having adjacent rib-shaped land portions (4) with circumferential grooves (3) therebetween. Annular elongate projection portions (5, 5) project toward each other from adjacent rib-shaped land portions (4). The elongate projection portions (5, 5) confronting each other are disposed with a spacing therebetween such that their mutually confronting tip surfaces (5s, 5s) make contact with each other due to elastic deformation of the rib-shaped land portions (4, 4) at the time of grounding of the tire. An inside groove space (6) is formed on a radially inner side of the confronting elongate projection portions (5, 5) and an outside groove space (7) is formed on a radially outer side of the elongate projection portions (5, 5). The tip surfaces (5s) of the elongate projection portions (5) are formed with a plurality of communication recesses (9) providing communication between the inside and outside groove spaces (6, 7).

(Continued)

The communication recesses (9) are formed at intervals in a tread circumferential direction. It is thus possible to enhance rigidity of the rib-shaped land portions over the whole tread at the time of grounding of the tire, thereby to suppress elastic deformation of the rib-shaped land portions and to reduce rolling resistance, while securing a draining property attributable to the circumferential grooves.

5 Claims, 7 Drawing Sheets

(51) Int. Cl.
  *B60C 11/12* (2006.01)
  *B60C 11/03* (2006.01)
  *B60C 11/13* (2006.01)
(52) U.S. Cl.
  CPC ........ *B60C 11/0327* (2013.01); *B60C 11/042* (2013.01); *B60C 11/1236* (2013.01); *B60C 11/1281* (2013.01); *B60C 11/13* (2013.01); *B60C 11/032* (2013.01); *B60C 11/1315* (2013.01); *B60C 2011/0344* (2013.01); *B60C 2011/0386* (2013.01); *Y02T 10/86* (2013.01)

(56) References Cited

U.S. PATENT DOCUMENTS

| 2,696,863 | A | | 12/1954 | Ewart et al. |
| 3,556,190 | A | * | 1/1971 | Riches ................ B60C 11/0309 |
| | | | | 152/209.21 |
| 2004/0182487 | A1 | * | 9/2004 | Lopez ................... B60C 11/032 |
| | | | | 152/209.17 |
| 2013/0139937 | A1 | * | 6/2013 | Gayton ............... B60C 11/0306 |
| | | | | 152/209.18 |
| 2013/0206292 | A1 | | 8/2013 | Foucher et al. |
| 2013/0206296 | A1 | | 8/2013 | Bestgen |
| 2013/0340905 | A1 | | 12/2013 | Bechon et al. |

FOREIGN PATENT DOCUMENTS

| JP | 2002-219909 A | | 8/2002 |
| JP | 2007-253875 A | | 10/2007 |
| JP | 2008296858 A | * | 12/2008 |
| JP | 2009-255765 A | | 11/2009 |
| JP | 2013-519562 A | | 5/2013 |
| JP | 2013-525194 A | | 6/2013 |
| JP | 2013-543815 A | | 12/2013 |
| JP | 2014509980 A | | 4/2014 |
| JP | 2014510669 A | | 5/2014 |
| WO | 2015/114128 A1 | | 8/2015 |

OTHER PUBLICATIONS

Communication dated Nov. 26, 2018, from the European Patent Office in counterpart European Application No. 16868281.3.
Communication dated May 28, 2019 from the Japanese Patent Office in application No. 2015-228382.
International Search Report of PCT/JP2016/080359 dated Dec. 27, 2016.

* cited by examiner

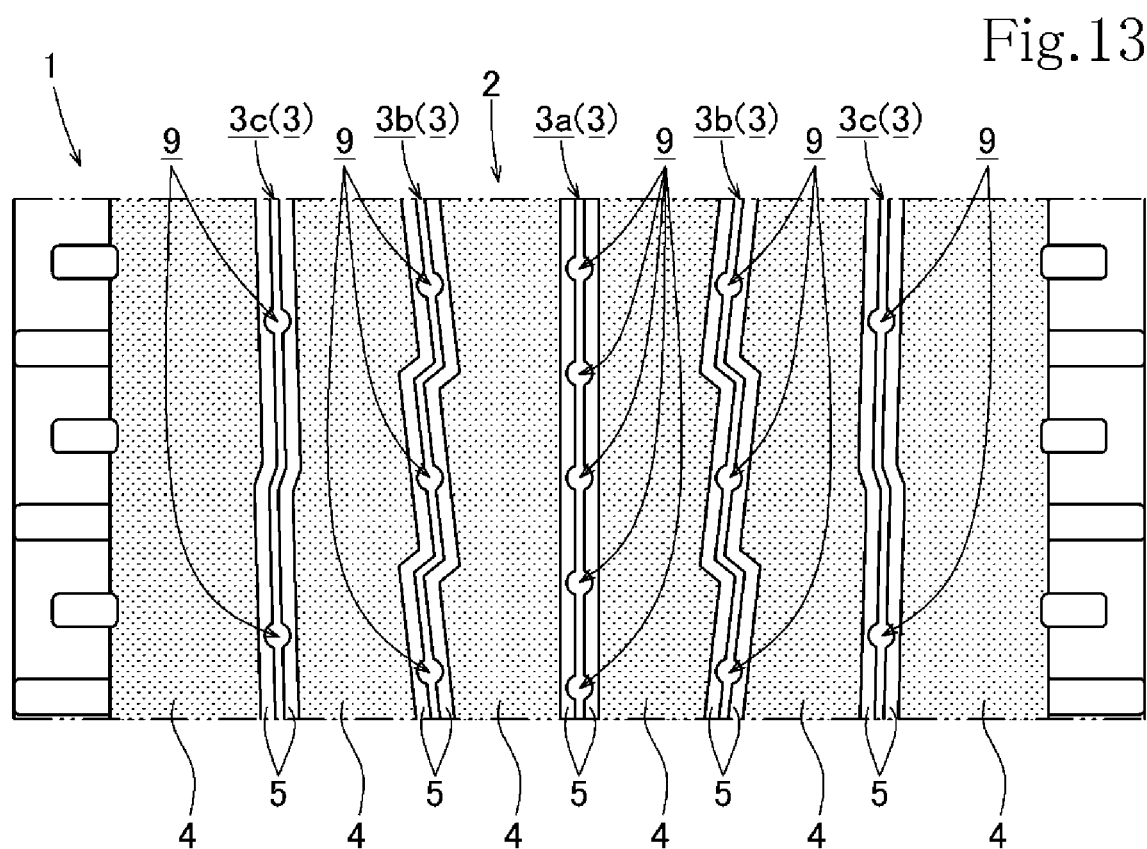

PNEUMATIC TIRE

CROSS REFERENCE TO RELATED APPLICATIONS

This application is a National Stage of International Application No. PCT/JP2016/080359 filed Oct. 13, 2016, claiming priority based on Japanese Patent Application No. 2015-228382 filed Nov. 24, 2015.

TECHNICAL FIELD

The present invention relates to a pneumatic tire formed with a plurality of rib-shaped land portions separated by a plurality of circumferential grooves, and particularly to a tire tread structure.

BACKGROUND ART

A pneumatic tire having a tread provided with a plurality of circumferential grooves to configure a rib pattern is designed to promote draining by the circumferential grooves even on a wet road surface, so as to thereby secure a frictional force (wet grip performance).

However, when rib-shaped land portions divided by the circumferential grooves undergo elastic deformation, such as compressive deformation or falling-down, due to grounding of the rib-shaped land portions, heat is generated in the tread part due to loss of energy arising from hysteresis loss generated by the deformation, so that rolling resistance tends to increase.

In view of this, there has been proposed a tire in which projection portions are formed to project toward each other from adjoining rib-shaped land portions with a circumferential groove therebetween, such that when the rib-shaped land portions are grounded, the confronting projection portions make contact with each other and support each other, to maintain the rigidity of the rib-shaped land portions and to restrain deformation of the rib-shaped land portions (refer, for example, to PATENT DOCUMENT 1).

PRIOR ART

[Patent Document]
[Patent Document 1]
JP 2011-245996 A

Patent Document 1 proposes a structure for restraining buckling wherein tire grounding area is reduced or grounding pressure is lowered due to compressive stresses in the tire radial directions that arise from external forces exerted on the tread from its lateral sides at the time of turning of the vehicle. In the structure, projection portions are formed to partly project into the circumferential grooves adjacent to tread transverse ends, to enhance the rigidity of the rib-shaped land portions at the tread transverse ends against compressive stresses in the tire radial directions, so as to thereby enhance cornering power.

In the structure of PATENT DOCUMENT 1, therefore, only the circumferential grooves adjacent to the tread transverse ends are provided with the projection portions.

Further, the projection portions are disposed in the tread circumferential direction at an interval that is greater than the size of the projection portions.

SUMMARY OF THE INVENTION

Underlying Problem to be Solved

The pneumatic tires having the rib pattern configured in the tread are often used mainly for heavy-load vehicles such as trucks and buses. In the pneumatic tires for heavy load use, compressive deformation or falling-down of the rib-shaped land portions due to the grounding of the rib-shaped land portions divided by the circumferential grooves is large. In the case where only the circumferential grooves adjacent to the tread transverse ends are provided with the projection portions and the projection portions are disposed at large intervals in the tread circumferential direction as in PATENT DOCUMENT 1, therefore, it is difficult to maintain the rigidity of the rib-shaped land portions over the whole tread part, the amount of heat generated at the tread part due to the elastic deformation is large, and rolling resistance cannot be suppressed sufficiently.

The present invention has been made in consideration of the above-mentioned problems. It is therefore an object of the present invention to provide a pneumatic tire by which it is possible, while securing a draining property of circumferential grooves, to enhance rigidity of rib-shaped land portions over the whole tread at the time of grounding of the tread, to thereby suppress elastic deformation of the rib-shaped land portions, and to sufficiently reduce rolling resistance.

Means to Solve the Underlying Problem

In order to achieve the above object, the present invention provides a pneumatic tire formed with a plurality of rib-shaped land portions separated by circumferential grooves extending in a tread circumferential direction, characterized in that:

elongate projection portions project toward each other from the rib-shaped land portions adjacent to each other with one of the circumferential grooves therebetween, the elongate projection portions being formed in an annular shape extending in the tread circumferential direction; the elongate projection portions confronting each other are disposed with a spacing therebetween such that mutually confronting tip surfaces of the elongate projection portions make contact with each other through elastic deformation of the rib-shaped land portions at a time of grounding of the tire; the circumferential groove has formed therein with an inside groove space on a radially inner side of the confronting elongate projection portions, and with an outside groove space on a radially outer side of the confronting elongate projection portions; and the confronting elongate projection portions have confronting tip surfaces thereof formed with a plurality of communication recesses providing communication between the outside groove space and the inside groove space, the communication recesses being formed at intervals in the tread circumferential direction.

According to this feature, the elongate projection portions, projecting toward each other from the adjoining rib-shaped land portions with the circumferential groove therebetween, are formed in an annular shape while extending in the tread circumferential direction, and the annular confronting elongate projection portions are disposed with a spacing therebetween such that the mutually confronting tip surfaces of the elongate projection portions make contact with each other due to elastic deformation of the rib-shaped land portions at the time of grounding of the tire. Therefore, in the rib-shaped land portions at any part of the whole circumference of the tread, it is ensured that at the time of grounding, the annular confronting elongate projection portions make contact with each other and support each other firmly, to enhance the rigidity of the rib-shaped land portions, whereby elastic deformation of the rib-shaped land portions is suppressed, so that rolling resistance can be securely reduced.

Further, the tip surfaces of the elongate projection portions are formed with the communication recesses providing communication between the outside groove space and the inside groove space, and the communication recesses are provided in plurality in the tread circumferential direction. Therefore, even when the annular elongate projection portions of the rib-shaped land portions, which are grounded, make contact with each other, the communication between the outside groove space and the inside groove space is secured, so that water in the outside groove space, where the outer circumferential opening is closed due to grounding, can be released through the communication recesses into the inside groove space and can be drained to the exterior through the gap between the elongate projection portions in non-grounded parts and through the outside groove space. As a result, a draining property of the circumferential grooves can be secured, and required wet grip performance can also be maintained.

In the above-mentioned structure, the mutually confronting tip surfaces of the confronting elongate projection portions are preferably formed with the communication recesses in a mutually opposed manner.

According to this configuration, even where the recessing volume of the communication recesses formed in the tip surfaces of the elongate projection portions is suppressed to be small and the rigidity of the elongate projection portions themselves is thereby enhanced, it is ensured that when the rib-shaped land portions are grounded and the confronting elongate projection portions make contact with each other, the communication recesses provided at mutually opposed positions of the mutually confronting tip surfaces of the elongate projection portions can be mated with each other to form communication holes with a large passage area. Therefore, it is possible, while keeping a good draining property, to permit the highly rigid elongate projection portions to support each other firmly, to restrain elastic deformation of the rib-shaped land portions, and to reduce rolling resistance.

In the above-mentioned structure, the elongate projection portions projecting from the rib-shaped land portions may be formed to extend to the tip surfaces, respectively, in a form of a conical surface extending radially inward from tread surfaces on the rib-shaped land portions.

According to this configuration, the elongate projection portions projecting from the rib-shaped land portions are formed to project to the tip surfaces in the form of a conical surface extending radially inward from the tread surfaces of the rib-shaped annular land portions. Therefore, the outside groove space between the mutually opposed conical surfaces of the confronting elongate projection portions has a tread transverse width gradually reduced from radially outer side to radially inner side. Accordingly, water in the outside groove space where an outer opening is closed due to grounding can easily be collected and led into the communication recesses, the water can smoothly be released through the communication recesses into the inside groove space, and can easily be drained to the exterior through the gaps between the confronting elongate projection portions at non-grounded parts and through the outside groove space. As a result, a draining property can be enhanced, and wet grip performance can be kept good.

In the above-mentioned configuration, the elongate projection portions in the circumferential grooves in outermost areas with respect to tread width directions preferably have a smaller inclination angle of the conical surface than the elongate projection portions in the circumferential grooves in a central area with respect to the tread width directions.

Here, the inclination of the conical surface refers to the inclination of the generating line (a straight line on a conical surface that passes through the vertex of the cone) relative to the center axis of the cone, and that the inclination of the conical surface is small means that the angle (inclination angle) of the generating line relative to the center axis of the cone is small.

According to this configuration, the elongate projection portions in the circumferential grooves on the outermost sides with respect to the tread width directions have smaller inclination of the conical surfaces than the elongate projection portions in the circumferential grooves on the central area with respect to the tread width directions. Therefore, the rigidity of the rib-shaped land portions on the outermost sides against compressive stress at the time of grounding can be made higher, falling-down of the rib-shaped land portions on the outermost sides at the time of turning of the vehicle can thereby be restrained as securely as possible, and cornering power can be enhanced. In addition, because of the structure in which the inclination of the conical surfaces of the elongate projection portions is small and the outside groove space does not tend to be closed due to grounding, draining is accomplished extremely easily, and wet grip performance can be made better.

In the above-mentioned configuration, the communication recesses are preferably formed rectilinearly while being oriented in radial directions, respectively.

According to this configuration, the communication recesses are formed rectilinearly while being oriented in radial directions. Therefore, the communication recess can provide shortest-distance communication between the inside groove space and the outside groove space, the draining route can be shortened, and a draining property can be enhanced.

In the above-mentioned configuration, each of the communication recesses may be formed rectilinearly while being oriented in a direction inclined relative to a radial direction, in such a manner that each communication recess has an inside opening communicating with the inside groove space and an outside opening communicating with the outside groove space, the outside opening being located at a position displaced relative to the inside opening in a tire rotational direction at a time of forward travel of a vehicle.

According to this configuration, the communication recesses provide rectilinear communication between the inside opening in the inside groove space and the outside opening in the outside groove space, the outside opening located at a position shifted from the inside opening in the tire rotational direction at the time of forward travel of the vehicle. Therefore, particularly at the time of forward-traveling rotation, it is possible to promote the leading of water, present in the outside groove space where the outer circumferential opening is closed due to grounding, into the communication recesses in the manner of drawing through the outside openings of the communication recesses and the releasing of the water through the inside opening into the inside groove space. As a result, a draining property at the time of forward vehicle travel, when the tires are often rotated at a higher speed than in the time of backward vehicle travel, is improved, and wet grip performance can be obtained effectively.

In the above-mentioned configuration, the circumferential groove located in a central area with respect to tread width directions has preferably a greater number of the communication recesses formed in the elongate projection portions than the circumferential grooves provided in outermost areas with respect to tread width directions.

According to this configuration, the circumferential groove located in the central area has a greater number of the communication recesses formed in the elongate projection portions than the circumferential grooves provided in outermost areas. For this reason, draining in the circumferential groove in the central area, where particularly smooth draining is required because of the larger compressive deformation of the rib-shaped land portions at the time of grounding of the tire, can be efficiently accomplished by the communication recesses which are provided in larger number and at smaller intervals. As a result, good wet grip performance can be secured.

Advantageous Effects of Invention

According to the present invention, the confronting elongate projection portions on the adjoining rib-shaped land portions with the circumferential grooves formed therebetween, are formed in an annular shape while extending in the tread circumferential direction. Therefore, on the rib-shaped land portion in any area of the whole tread part, it is ensured that at the time of grounding, the confronting elongate projection portions are caused to make contact with each other and support each other firmly, to enhance rigidity, whereby rolling resistance can be securely reduced. Furthermore, the tip surfaces of the elongate projection portions are formed with the communication recesses providing communication between the inside groove space and the outside groove space, and the communication recesses are provided in plural number and at intervals in the tread circumferential direction. Therefore, even when the elongate projection portions of the rib-shaped land portions being grounded make contact with each other, the communication between the outside groove space and the inside groove space is maintained by the communication recesses, so that a draining property of the circumferential grooves can be secured, and required wet grip performance can also be maintained.

BRIEF DESCRIPTION OF DRAWINGS

FIG. 13 is a partial plan view of a tread of a pneumatic tire of Example 8 in the present invention.

MODE FOR CARRYING OUT THE INVENTION

A pneumatic tire according to embodiments or examples of the present invention will be described below.

The present pneumatic tire has a rib pattern configured in a tread wherein a plurality of circumferential grooves extending in a tread circumferential direction is provided in an arrangement juxtaposed in a tread width direction, whereby a plurality of belt-shaped, or rib-shaped, land portions are formed.

One example, Example 1, of such a pneumatic tire is depicted in FIGS. 1 to 8 and will be described.

Figure 1:
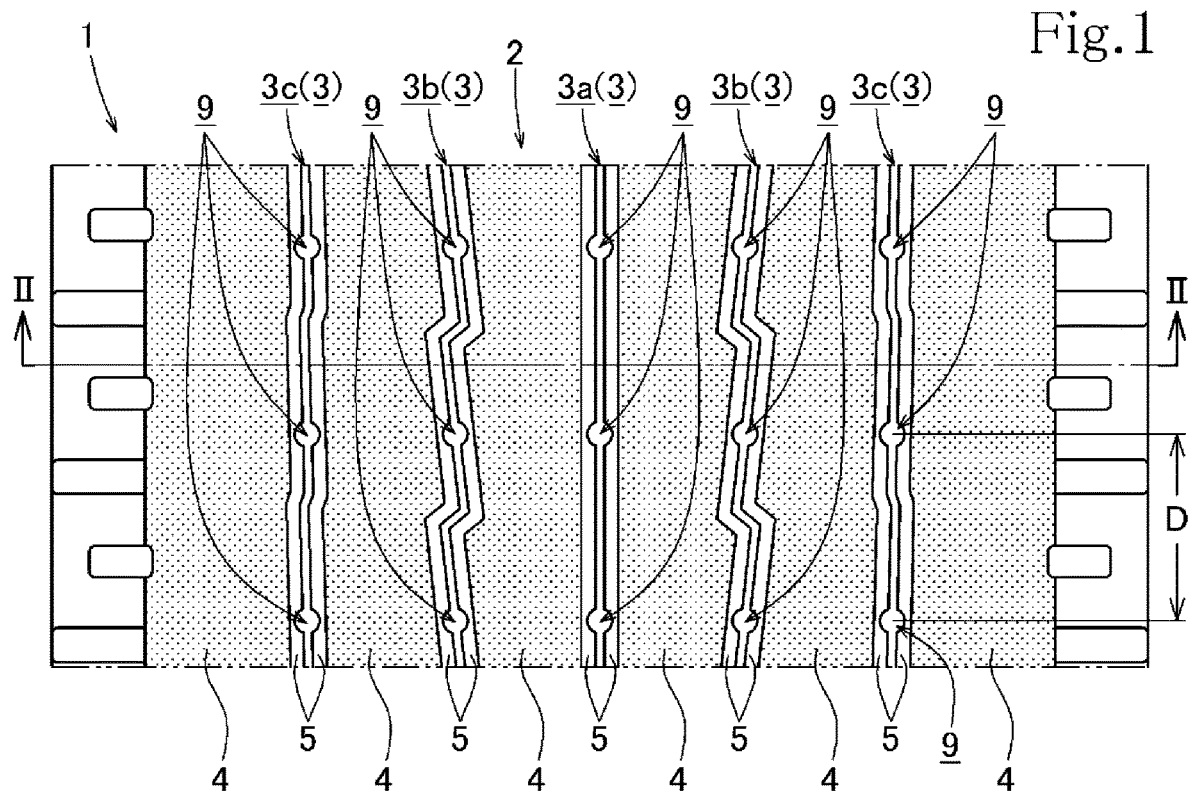
FIG. 1 is a partial plan view as viewed in a radial direction of a tread of a pneumatic tire of Example 1 according to the present invention.
Figure 2:
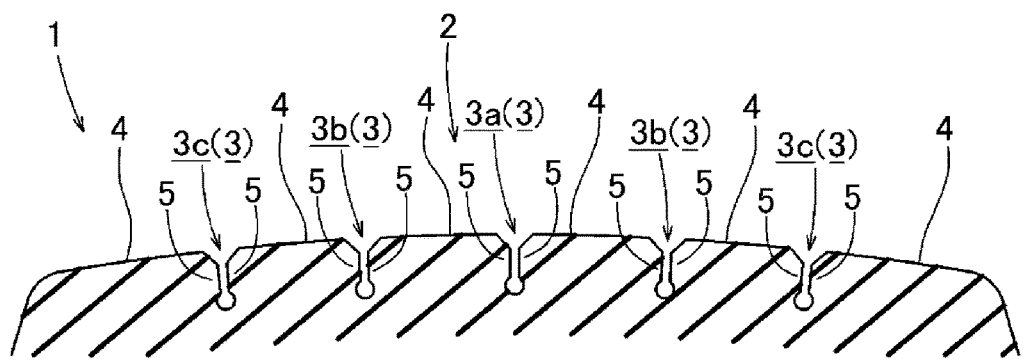
FIG. 2 is a sectional view taken along line II-II of FIG. 1.

Referring to FIGS. 1 and 2, a tread 2 of a pneumatic tire 1 of Example 1 is provided with a rib pattern wherein five circumferential grooves 3 extend in the tread circumferential direction, whereby six belt-shaped, or rib-shaped, land portions (the portions given a disperse dot pattern in FIG. 1) 4 are formed.

The circumferential groove 3a in the center in the tread width direction is formed rectilinearly; the circumferential grooves 3b provided on both sides of the circumferential groove 3a each have a plurality of rectilinear portions which are oriented in directions inclined relative to the circumferential direction and are formed continuously in a zigzag pattern; and the circumferential grooves 3c provided further on both sides of the circumferential grooves 3b each have a plurality of rectilinear portions which are oriented in directions less inclined relative to the circumferential direction than the circumferential grooves 3b and are formed continuously in a zigzag pattern (see FIG. 1).

Figure 3:
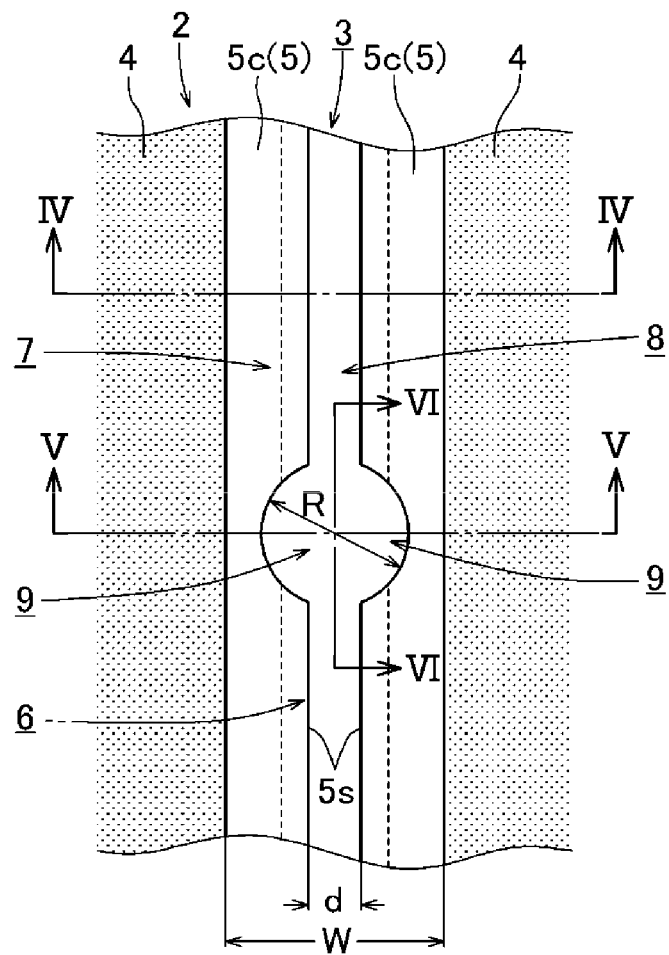
FIG. 3 is a partial enlarged plan view of FIG. 1.

As depicted in FIG. 3, the five circumferential grooves 3 have the same groove width W, for example, a groove width of 10 mm, and the circumferential grooves 3b and the circumferential grooves 3c on both sides of the central circumferential groove 3a are provided at symmetric positions and in a symmetric shape with respect to the central circumferential groove 3a.

Figure 4:
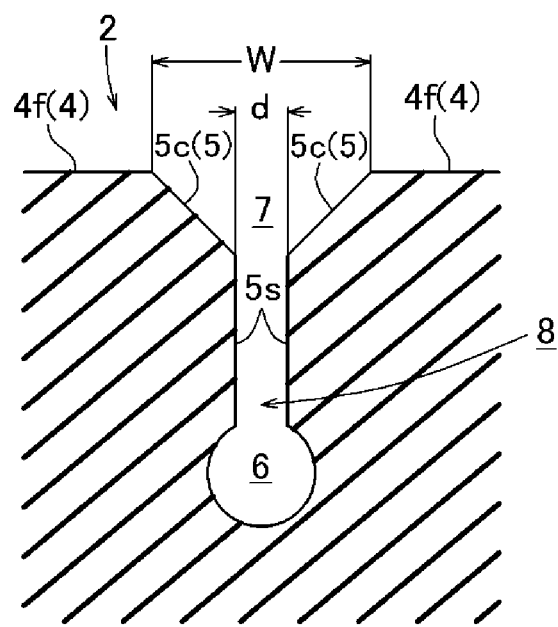
FIG. 4 is a sectional view taken along line IV-IV of FIG. 3.

Referring to FIGS. 3 and 4, elongate projection portions 5, projecting toward each other from the opposing rib-shaped land portions 4 located adjacently to each other with the circumferential groove 3 therebetween, are formed in an annular shape and extend in the tread circumferential direction.

By the elongate projection portions 5 confronting each other, each circumferential groove 3 is formed, in an annular shape, with a radially inside groove space 6 enlarged on a radially inner side of the confronting annular elongate projection portions 5. Each circumferential groove 3 is formed with a radially outside annular groove space 7 between radially outer circumferential portions of the confronting elongate projection portions 5.

Referring to FIG. 4, the elongate projection portion 5 projecting from each rib-shaped land portion 4 is formed to have a conical surface 5c inclined toward the radially inner side to be connected to a tip surface 5s, the conical surface 5c continuing from a tread surface 4f of the annular rib-shaped land portion 4.

Therefore, as depicted in FIG. 4, the outside groove space 7 between outer circumferential portions of the confronting elongate projection portions 5 is, in a radial section, in the shape of an isosceles trapezoid with the conical surfaces 5c on both sides as leg sides.

The inside groove space 6 on the inner circumference side of the confronting elongate projection portions 5 is formed in an annular shape which is circular in section.

An annular gap 8 is present between the mutually confronting tip surfaces 5s of the elongate projection portions 5.

A spacing (width of the gap 8) d between the mutually confronting tip surfaces 5s is set to be such a spacing that the tip surfaces 5s of the confronting elongate projection portions 5 come close to and make contact with each other due to elastic deformation of the rib-shaped land portions 4 grounded at the time of grounding of the tire.

In Example 1, the spacing (width of the gap 8) d between the mutually confronting tip surfaces 5s is 1.5 mm.

The tip surface 5s of each elongate projection portion 5 is provided with a plurality of radial communication recesses 9, which provide communication between the inside groove space 6 and the outside groove space 7, at regular intervals D in the tread circumferential direction (see FIG. 1).

In Example 1, the communication recesses 9 are formed rectilinearly in a mutually opposed manner, in the mutually confronting tip surfaces 5s of the confronting elongate projection portions 5.

Figure 5:
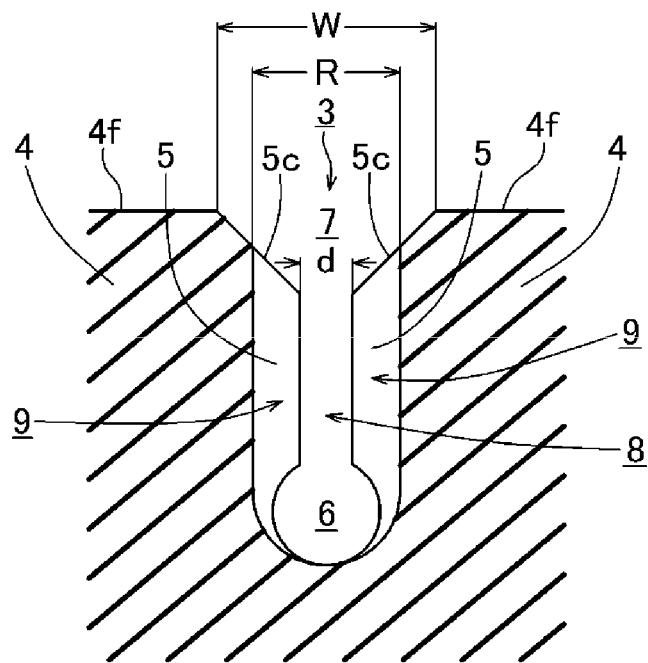
FIG. 5 is a sectional view taken along line V-V of FIG. 3.
Figure 6:
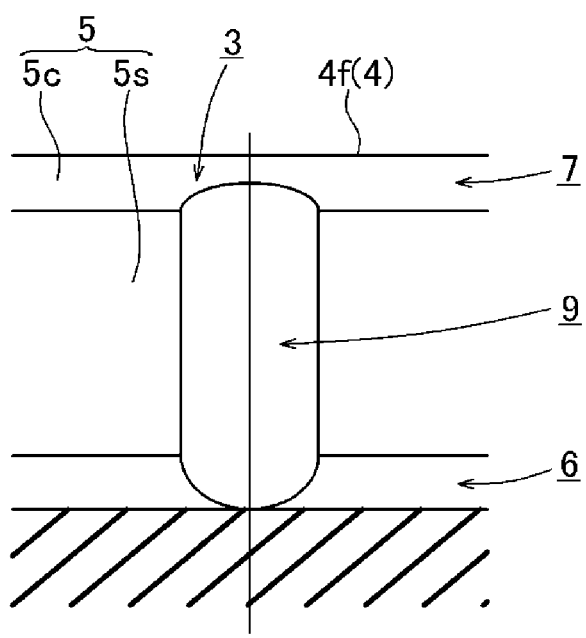
FIG. 6 is a sectional view taken along line VI-VI of FIG. 3.

As depicted in FIG. 5, the mutually opposed communication recesses 9 constitute a circular hole with a hole diameter R which is rectilinearly oriented in the radial direction in non-grounding state of the tire.

In Example 1, the hole diameter R of the circular hole constituted of the mutually opposed communication recesses 9 is 5 mm (see FIG. 5), and an interval D at which the communication recesses 9 are arranged in the tread circumferential direction is 50 mm (see FIG. 1).

Figure 7:
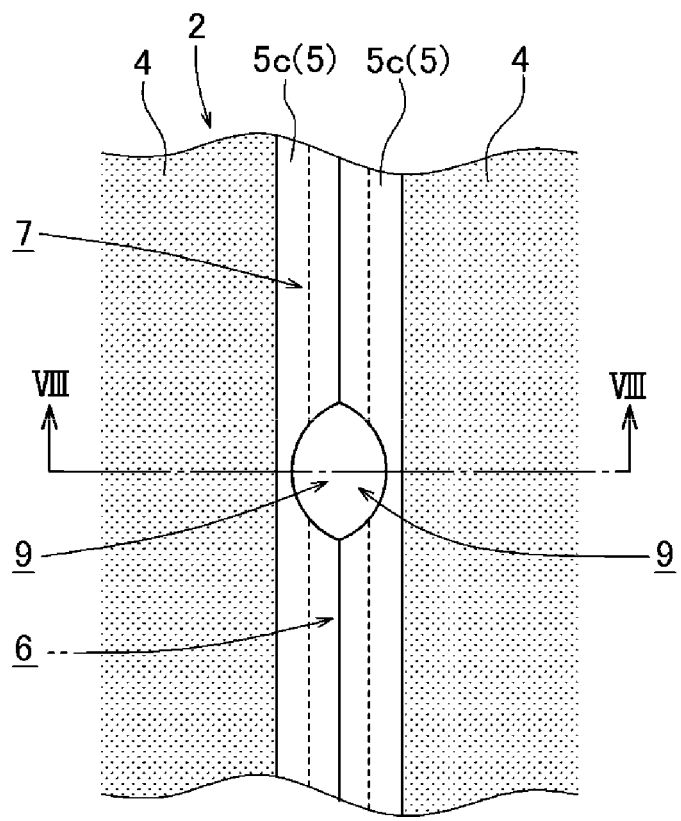
FIG. 7 is a partial plan view depicting a grounded state of the tread.
Figure 8:
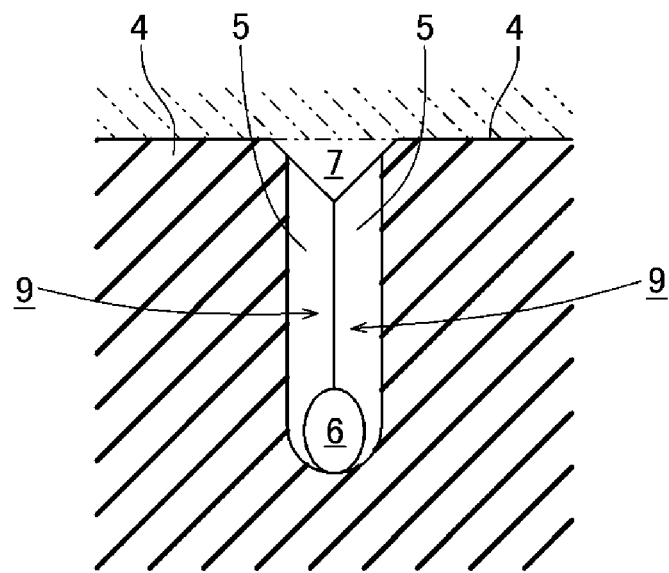
FIG. 8 is a sectional view taken along line VIII-VIII of FIG. 7.

FIGS. 7 and 8 depict a state in which the grounded rib-shaped land portions 4 of the pneumatic tire 1 having the tread 2 formed with such a rib pattern are compressed and elastically deformed.

As shown in FIGS. 7 and 8, when the rib-shaped land portions 4 are compressed and elastically deformed, the confronting elongate projection portions 5 come close to each other, and the mutually confronting tip surfaces 5s make contact with each other, leaving no gap 8 therebetween.

However, the communication recesses 9 of the mutually confronting tip surfaces 5s of the confronting elongate projection portions 5 are mated with each other, whereby communication holes (the communication recesses 9) providing communication between the inside groove space 6 and the outside groove space 7 are secured.

In this way, the elongate projection portions 5, projecting toward each other from the rib-shaped land portions 4 adjacent to each other with the circumferential groove 3 therebetween, are formed in an annular shape while extending in the tread circumferential direction, and the confronting elongate projection portions 5 are disposed with the spacing d therebetween such that the mutually confronting tip surfaces 5s of the elongate projection portions 5 make contact with each other due to elastic deformation of the rib-shaped land portions 4 grounded at the time of grounding of the tire. For this reason, in the belt-shaped land portions 4 in any part of the whole tread, upon grounding, the parts of the confronting elongate projection portions 5, which are annularly shaped, make contact with each other to mutually support each other firmly and enhance rigidity of the rib-shaped land portions 4, whereby elastic deformation is restrained, so that uneven wear is suppressed, and rolling resistance can be securely reduced.

Since the tip surfaces of the elongate projection portions 5 are formed with the communication recesses 9 for providing communication between the inside groove space 6 and the outside groove space 7 at intervals in the tread circumferential direction, communication between the outside groove space 7 and the inside groove space 6 is secured even at the time of contact between the elongate projection portions 5 of the rib-shaped land portions 4 in grounded state. Therefore, water in the outside groove space 7 where an outer circumferential opening is closed due to the grounding is released through the communication recesses 9 into the inside groove space 6, and the water can be drained from the inside groove space 6 through the gap 8 between the elongate projection portions 5 in non-grounded areas and through the outside groove space 7 in non-grounded areas. As a result, a full draining property of the circumferential grooves 3 can be secured, and a required wet grip performance can also be maintained.

In addition, since the mutually confronting tip surfaces 5s of the confronting elongate projection portions 5 are formed with the communication recesses 9 in the opposed manner, it is ensured that even in a case where the recessed volume of the communication recess 9 formed in the tip surface 5s of the elongate projection portion 5 is set small to enhance the rigidity of the elongate projection portion 5, and when the rib-shaped land portions 4 are grounded to cause the confronting elongate projection portions 5 to make contact with each other, the communication recesses 9, located at mutually opposed positions of the mutually confronting tip surfaces 5s of the elongate projection portions 5, are mated with each other and cooperate to provide communication holes (the communication recesses 9) with a sufficiently large passage sectional area. Therefore, while a good draining property is maintained, the elongate projection portions 5 with high rigidity mutually support each other firmly, whereby elastic deformation of the rib-shaped land portions 4 is suppressed, and rolling resistance can be reduced.

Further, since the elongate projection portions 5 projecting from the rib-shaped land portions 4 are formed to project, in the shape of a tapered conical surface 5c, to the tip surfaces 5s from the tread surfaces 4f of the rib-shaped land portions 4 which are in annular shape, the outside groove spaces 7 between the mutually opposed conical surfaces 5c of the confronting elongate projection portions 5 are gradually reduced in width in the tread width direction from the outer circumference side toward the inner circumference side. Therefore, water in the outside groove spaces 7 where their outer circumferential openings are closed due to the grounding is easily collected and led into the communication recesses 9, and the water can be smoothly released through the communication recesses 9 into the inside groove space 6, and can be easily drained to the exterior through the gap 8 between the elongate projection portions 5 in non-grounded areas and through the outside groove space 7 in the non-grounded areas. As a result, draining property can be enhanced, and wet grip performance can be kept good.

Furthermore, since the communication recesses 9 are rectilinearly formed while being oriented in the radial direction, the communication recesses 9 provide shortest-distance communication between the outside groove space 7 and the inside groove space 6, thereby shortening the draining route and enhancing the draining property.

While the shape of the mutually opposed communication recesses 9 is a circular hole with a hole diameter of 5 mm in Example 1 described above, the shape of the communication recesses 9 may not be a circular hole but may be a square hole (Example 2). In this case, the communication recesses 9 forming the square hole are each a square hole sized 5 mm by 5 mm, for example, and, in other points, Example 2 is the same as Example 1 in tread structure.

For the pneumatic tire 1 having the tread structure with the rib pattern according to the examples of the present invention, test results of rolling resistance performance and wet grip performance are indicated in [Table 1] below as evaluation results wherein Example 1 and Example 2 are contrasted to each other, together with Comparative Example, with Prior Art Example as a reference.

Specifications are also indicated in [Table 1].

The evaluation results of a rolling resistance coefficient RRC depicted in [Table 1] were obtained by a method wherein with respect to rolling resistance coefficient RRC obtained by dividing the measured value of rolling resistance by load, the reciprocal of the rolling resistance is used, and is expressed in index while taking the value for Prior Art Example as 100.

A higher value of this index means a lower rolling resistance.

TABLE 1

| Communication hole (Communication recess) | Prior Art Example (Elongate projection portion, absent) | Comparative Example (Elongate projection portion, present) | Example 1 (Elongate projection portion, present) | Example 2 (Elongate projection portion, present) |
| --- | --- | --- | --- | --- |
| Shape | — | Communication recess, absent | Circular hole | Square hole |
| Hole diameter (size) | — | — | R: 5 mm | 5 × 5 mm |
| Inclination θ | — | — | 0° | 0° |
| Circumferential interval D | — | — | 50 mm | 50 mm |
| Rolling resistance coefficient RRC (index) | 100 | 108 | 106 | 106 |
| Wet grip index | 100 | 93 | 97 | 97 |

The pneumatic tire of Example 1 has a tire size of 315/70R22.5, and its tread is formed with the annular elongate projection portions 5 projecting from the rib-shaped land portions 4 adjacent to each other through the circumferential groove 3 having a groove width of 10 mm, and the spacing d between the mutually confronting tip surfaces 5s of the elongate projection portions 5 is 1.5 mm, as aforementioned.

The mutually confronting tip surfaces 5s of the confronting elongate projection portions 5 are formed with the communication recesses 9 in a mutually opposed manner, an inclination θ (angle relative to the radial direction) of the communication recesses 9 is 0°, the hole diameter R of the circular hole of the communication recesses 9 is 5 mm, and the communication recesses 9 are formed at an interval D of 50 mm in the tread circumferential direction.

In Example 1, the communication recesses 9, formed in each of the elongate projection portions 5 of the five circumferential grooves 3, are aligned in a row in the tread width direction.

In addition, in Example 2, the shape of the communication recesses 9 is a square hole sized 5 mm by 5 mm.

On the other hand, Prior Art Example is an example wherein the pneumatic tire is a pneumatic tire having the same size as in Example 1 and having a tread with the same rib pattern formed with the same circumferential grooves as in Example 1, but the circumferential grooves do not have projecting portions such as the elongate projection portions.

Comparative Example is an example wherein the pneumatic tire is the pneumatic tire according to Prior Art Example, wherein the circumferential grooves have annularly shaped elongate projection portions, but the communication recesses are not formed therein.

For the pneumatic tires of Examples 1 and 2 and Prior Art Example and Comparative Example, performance tests on rolling resistance performance and wet grip performance were conducted, and the evaluation results thereof are indicated in [Table 1].

In the rolling resistance test, the rolling resistance was measured by the force method according to the international standard ISO 28580.

In the wet grip test, wet grip was measured by the actual car method according to the international standard ISO 15222.

The evaluation results of the wet grip performance depicted in [Table 1] are measured values of wet grip, expressed in index while taking the value in Prior Art Example as 100.

A higher value of this index means better wet grip performance.

As indicated in [Table 1], in Comparative Example wherein the elongate projection portions are provided but the communication recesses are not provided, a good rolling resistance performance as represented by a rolling resistance coefficient RRC of 108 was obtained, but wet grip performance was considerably lowered as represented by a wet grip performance of 93, as compared to Prior Art Example wherein the circumferential grooves were not provided with elongate projection portions.

The reason for these results is as follows. In Comparative Example, the circumferential grooves are provided with the elongate projection portions which have no communication recesses, so that the confronting elongate projection portions make contact with each other to mutually support each other firmly, whereby rigidity of the rib-shaped land portions is enhanced, and rolling resistance can be lowered. However, since the communication recesses are not provided, water in the outside groove space where the outer circumferential opening is closed due to grounding cannot be released into the inside groove space and to the exterior, so that draining property is poor and wet grip performance is lowered.

On the other hand, in Example 1, the elongate projection portions 5 have the communication recesses 9, the shape of the communication holes (the communication recesses 9) is a circular hole, the hole diameter R of the communication recesses 9 is approximately 5 mm, and the inclination θ (the angle relative to the radial direction) of the communication holes is 0°.

Besides, the interval D of the communication holes disposed in the tread circumferential direction in Example 1 is 50 mm.

In the evaluation results of such Example 1 in comparison with Comparative Example 1 while taking Prior Art Example as a reference, the rolling resistance coefficient RRC is 106, which is inferior to the value of 108 for Comparative Example, but a high rolling resistance performance is secured.

The wet grip index for Example 1 is 97, which is a considerably high index as compared to the wet grip index of 93 for Comparative Example, and this index for Example 1 means that sufficient wet grip performance is maintained.

This is attributable to the fact that since the elongate projection portions 5 in Example 1 have the communication recesses 9, water in the outside groove space 7 where the outer circumferential opening is closed due to grounding can be released through the communication holes (the communication recesses 9) into the inside groove space 6 and can be drained to the exterior, so that the draining property of the circumferential grooves 3 is good.

In Example 2 wherein the shape of the communication hole is a square hole, the rolling resistance coefficient RRC is 106, and the wet grip index is 97, so that both the rolling resistance coefficient RRC and the wet grip index are the same as those in Example 1.

In other words, in the case of communication holes which are substantially the same in passage area, the rolling resistance performance and the wet grip performance are not influenced by the difference in the shape of the communication hole.

For the pneumatic tires 1 according to other Examples 3, 4, 5, and 6, the test results of rolling resistance performance and wet grip performance are indicated in [Table 2].

The shapes of communication holes in Examples 3, 4, 5, and 6 are all circular holes.

elongate projection portions are absent; thus, the same best wet grip performance as that in Prior Art Example is maintained.

In the pneumatic tire 1 in Example 4, the communication holes (communication recesses) formed in the elongate projection portions are small circular holes with a hole diameter of 2 mm; in other points, the pneumatic tire 1 is the same as that in Example 1.

In Example 4, according to the small hole diameter of the communication holes, the mutual support of the confronting elongate projection portions is strong and the rigidity of the rib-shaped land portions is also high, as compared to Example 1, and the rolling resistance coefficient RRC is 108, which is the same index value as that in Comparative Example wherein the elongate projection portions are not provided with the communication holes, and indicates best rolling resistance performance.

However, in Example 4, because of the hole diameter of the communication holes being small, water in the outside groove space 7 where the outer circumferential opening is closed due to grounding is difficult to be released through the communication holes (communication recesses 9) into the inside groove space 6, so that a draining property is poor. As a result, the wet grip index is as small as 95, indicating that the wet grip performance is inferior to Example 1.

In the pneumatic tire 1 in Example 5, the communication recesses 9 which are circular holes with a hole diameter of 5 mm are disposed at an interval D of 10 mm in the tread circumferential direction; in other points, the pneumatic tire 1 is the same as that in Example 1.

TABLE 2

| Communication hole (Communication recess) | Example 3 (Elongate projection portion, present) | Example 4 (Elongate projection portion, present) | Example 5 (Elongate projection portion, present) | Example 6 (Elongate projection portion, present) |
| --- | --- | --- | --- | --- |
| Shape | Circular hole | Circular hole | Circular hole | Circular hole |
| Hole diameter (size) | R: 10 mm | R: 2 mm | R: 5 mm | R: 5 mm |
| Inclination θ | 0° | 0° | 0° | +5° |
| Circumferential interval D | 50 mm | 50 mm | 10 mm | 50 mm |
| Rolling resistance coefficient RRC (index) | 105 | 108 | 105 | 105 |
| Wet grip index | 100 | 95 | 100 | 99 |

In the pneumatic tire 1 in Example 3, the communication holes (communication recesses) formed in the elongate projection portions are large circular holes with a hole diameter of 10 mm; in other points, the pneumatic tire 1 is the same as that in Example 1.

In Example 3, because of the hole diameter of the communication holes being large, the mutual support of the confronting elongate projection portions is slightly weak and the rigidity of the rib-shaped land portions is also slightly low, as compared to Example 1, and the rolling resistance coefficient RRC is 105, but this value is only slightly lower than that in Example 1 and still indicates sufficient rolling resistance performance.

In addition, in Example 3, because of the large hole diameter of the communication holes, water in the outside groove space 7 where the outer circumferential opening is closed due to grounding can be easily released through the communication holes (communication recesses 9) into the inside groove space 6 and can be drained to the exterior, so that a draining property of the circumferential grooves 3 is extremely good. The wet grip index is 100, which is the same index value as that in Prior Art Example wherein the In Example 5, since the interval D at which the communication recesses 9 are disposed in the tread circumferential direction is as small as 10 mm, the number of the communication recesses 9 formed in the circumferential grooves 3 is large accordingly.

For this reason, the mutual support of the confronting elongate projection portions is slightly weak and the rigidity of the rib-shaped land portions is also slightly low, as compared to Example 1, and the rolling resistance coefficient RRC is 105, which is only slightly lower than that in Example 1, and still indicates sufficient rolling resistance performance.

However, in Example 5, since the number of the communication recesses 9 formed in the circumferential grooves 3 is large, water in the outside groove space 7 where the outer circumferential opening is closed due to grounding can be easily released through the communication holes (communication recesses 9) into the inside groove space 6 and can be drained to the exterior, so that a draining property of the circumferential grooves 3 is extremely good, and the wet grip index is 100, which is the same index value as that in Prior Art Example wherein the elongate projection portions are absent; thus, the same best wet grip performance as that in Prior Art Example is maintained.

Note that in Example 5, the rolling resistance coefficient RRC and the wet grip index depict the same index values as those in Example 3 wherein the hole diameter of the communication holes (communication recesses 9) is enlarged.

Figure 9:
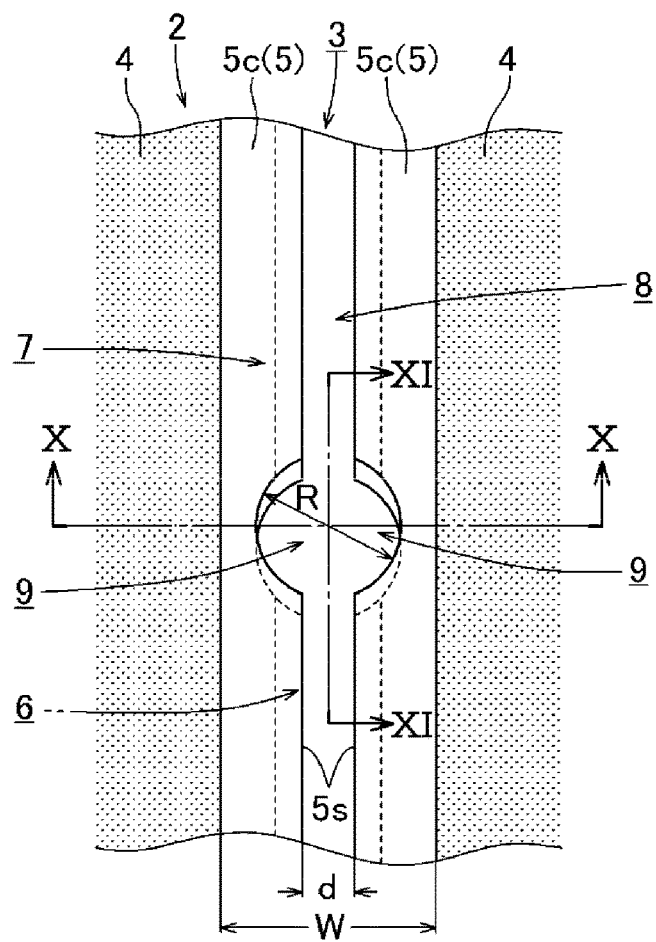
FIG. 9 is a partial enlarged plan view of a tread of a pneumatic tire of Example 6 of the present invention.
Figure 10:
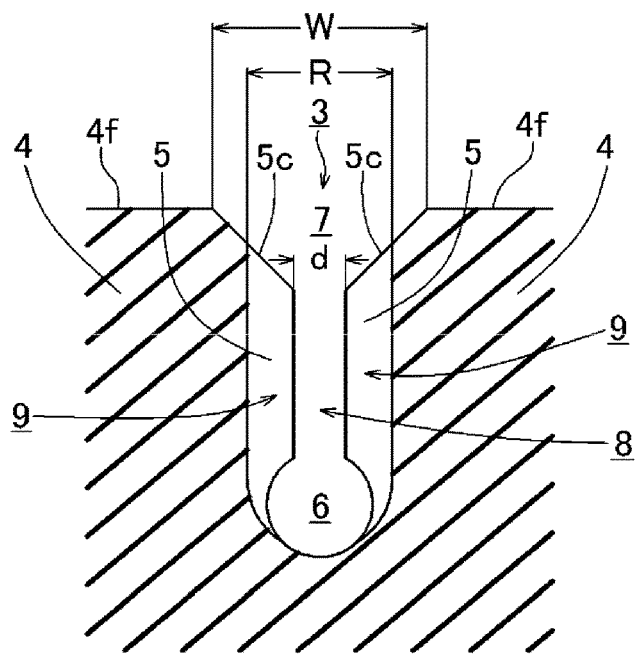
FIG. 10 is a sectional view taken along line X-X of FIG. 9.

Other Example 6 indicated in [Table 2] will be described below, based on FIGS. 9 to 11.

In Example 6, the pneumatic tire 1 of the same size as in Example 1 above has a tread structure substantially the same that as in Example 1, and, therefore, the same reference symbols as used above will be used.

Specifically, in a tread in Example 6, annularly shaped elongate projection portions 5 are formed to project toward each other from rib-shaped land portions 4 adjacent to each other with a circumferential groove 3 of a groove width W of 10 mm therebetween, and the spacing d between confronting tip surfaces 5s thereof is 1.5 mm.

In addition, the mutually confronting tip surfaces 5s of the confronting elongate projection portions 5 are formed with communication recesses 9 in a mutually opposed manner, a hole diameter R of a circular hole of the communication recesses 9 is 5 mm, and the communication recesses 9 are formed at an interval D of 50 mm in the tread circumferential direction.

In Example 6, however, unlike in Example 1, an inclination θ (the angle relative to the radial direction) of the communication recesses 9 is +5°.

Figure 11:
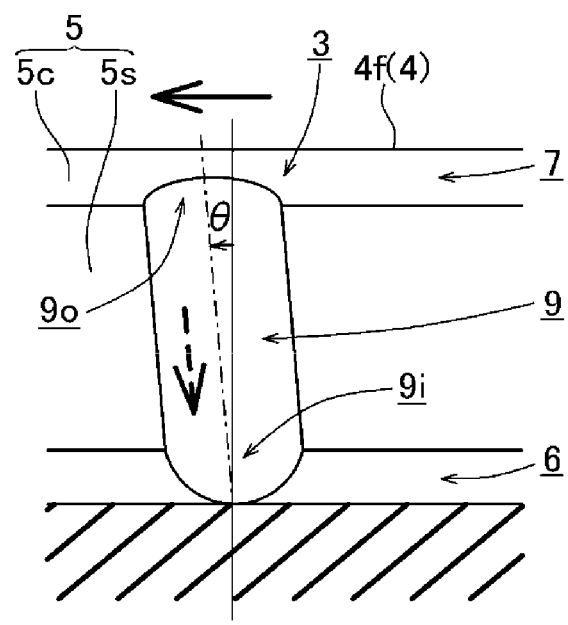
FIG. 11 is a sectional view taken along line XI-XI of FIG. 9.

Referring to FIG. 11, the communication recesses 9 are rectilinearly formed while being oriented in a direction inclined at an inclination θ of +5° relative to the radial direction in a tire rotational plane, while providing communication between an inside opening 9i to the inside groove space 6 and an outside opening 9o to the outside groove space 7, the outside opening 9o being located at a position shifted from the inside opening 9i in a tire rotational direction at the time of forward vehicle traveling (the direction indicated by an arrow in FIG. 11). Besides, this inclination θ is the inclination by which the radially outer side of the communication recesses 9 is advanced from the radially inner side of the communication recesses 9 in the tire rotational direction.

In this way, the communication recesses 9 have an inclination θ of +5° relative to the radial direction in the tire rotational plane. As a result, in the pneumatic tire 1 treading on a wet road surface during forward traveling, in a state in which the confronting elongate projection portions make contact with each other through compressive deformation of the grounded rib-shaped land portions 4 and the communication holes (communication recesses 9) providing communication between the outside groove space 7 and the inside groove space 6 are secured, the communication holes (communication recesses 9) are inclined at the angle θ of +5° relative to the radial direction.

For this reason, it is possible to promote transfer of water, present in the outside groove space 7 where the outer circumferential opening is closed due to the grounding, into the communication holes (communication recesses 9) in a manner of drawing water through the outside openings 9o of the communication holes (communication recesses 9) and releasing (see broken-line arrow in FIG. 11) the water through the inside openings 9i into the inside groove space 6. As a result, a draining property at the time of forward vehicle traveling, when the tire may be rotated at a high speed as compared to the time of backward vehicle traveling, is made to be better, and wet grip performance can be improved effectively.

In the evaluation results for Example 6 in [Table 2] above, the rolling resistance coefficient RRC is 105, which is a slightly low index value as compared to Example 1 and indicates substantially the same rolling resistance performance. The wet grip index is an extremely high index value of 99, indicating remarkable enhancement of wet grip performance.

Other Example 7 will be described below, based on FIG. 12 which depicts a section of a tread.

Figure 12:
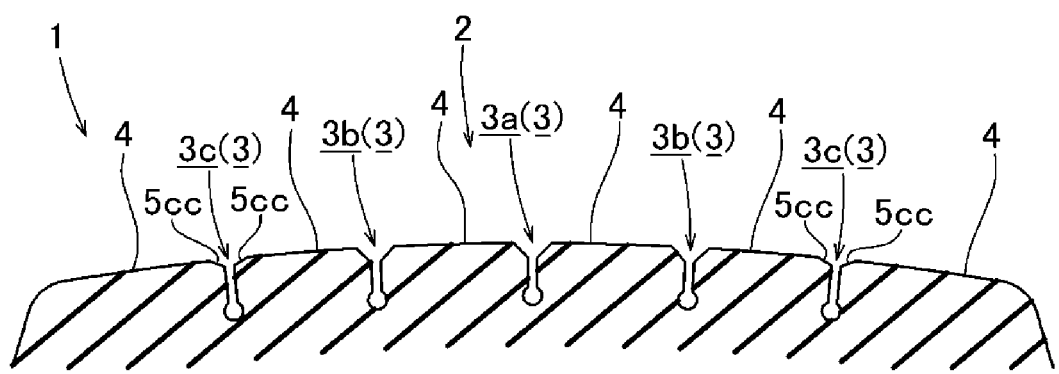
FIG. 12 is a sectional view of a tread of a pneumatic tire of Example 7 in the present invention.

In Example 7, the same reference symbols as in Example 1 are used in FIG. 12.

In Example 7, as depicted in FIG. 12, among the plurality of circumferential grooves 3 formed in the tread of the pneumatic tire 1 of Example 1 (see FIG. 2), the outermost-side circumferential grooves 3c are reduced in the inclination of conical surfaces 5cc of the confronting elongate projection portions 5.

The elongate projection portions 5 at the circumferential groove 3c on the outermost sides in the tread width directions are smaller in the inclination of the conical surface 5cc than the elongate projection portions 5 on the circumferential grooves 3a and 3b in the central region in the tread width directions where falling-down of the rib-shaped land portion 4 is smaller. Therefore, it is possible to further enhance rigidity of the rib-shaped land portion 4 in the outermost regions in the tread width directions against compressive stress at the time of grounding, to restrain as securely as possible the falling-down of the rib-shaped land portion 4 in the outermost regions at the time of turning of the vehicle, and to improve cornering power. In addition, since the structure is such that the inclination of the conical surfaces 5cc of the elongate projection portions 5 is small and the outside groove space is not liable to be closed due to grounding, draining is performed extremely easily, and wet grip performance can be made to be better.

FIG. 13 shows an example wherein the number of those communication recesses 9 formed in the tip surfaces 5s of the elongate projection portions 5 provided in the circumferential grooves 3 which are disposed in the tread circumferential direction is varied according to the position of the circumferential groove 3 arranged in the tread width direction, and this example will be described below as Example 8.

In Example 8, the same reference symbols as in Example 1 are used in FIG. 13 which depicts a partial plan view of a tread.

As depicted in FIG. 13, among the interval between the adjacent communication recesses 9 formed in the tread circumferential direction in the tip surfaces 5s of the elongate projection portions 5 provided in the circumferential grooves 3, the interval between the communication recesses 9 in the circumferential groove 3a in the central region in the tread width direction is the smallest, the interval between the communication recesses 9 in the circumferential grooves 3b provided on both sides of the circumferential groove 3a is greater, and the interval between the communication recesses 9 in the circumferential grooves 3c provided further on both sides of the circumferential grooves 3b is the greatest.

Therefore, the number of those communication recesses 9 arranged in the tread circumferential direction and formed in the tip surfaces 5s of the elongate projection portions 5 in the circumferential grooves 3 disposed in the central region is larger than the number of those communication recesses 9 in the outer regions in the tread width direction. This means that the interval between the mutually adjacent communication recesses 9 in the circumferential groove 3a in the central region in the tread width direction is smaller than the interval of the mutually adjacent communication recesses 9 in the outer regions. For this reason, draining operation in the circumferential groove in the central region, where particularly smooth draining is required because of the largest compressive deformation of the rib-shaped land portions 4 at the time of grounding of the tire, can be efficiently accomplished by the communication recesses 9 which are provided in a larger number and at smaller intervals. As a result, good wet grip performance can be secured.

While the tread structure of the pneumatic tire in the examples of the present invention has been described above, the mode of the present invention is not limited to the above examples, but includes those carried out in a variety of modes within the scope of the gist of the claimed invention.

Note that the pneumatic tire according to the present invention is one that has a tread provided with a rib pattern wherein rib-shaped land portions are formed by circumferential grooves, and the rib-shaped land portions may be formed with thin grooves, such as sipes, for wet grip performance, on-ice braking or the like.

REFERENCE SIGNS LIST

1 . . . Pneumatic tire, 2 . . . Tread, 3, 3a, 3b, 3c . . . Circumferential groove, 4 . . . Rib-shaped land portion, 5 . . . Elongate projection portion, 5c . . . Conical surface, 5s . . . Tip surface, 6 . . . Inside groove space, 7 . . . Outside groove space, 8 . . . Gap, 9 . . . Communication recess.

The invention claimed is:

1. A pneumatic tire formed with a plurality of rib-shaped land portions separated by circumferential grooves extending in a tread circumferential direction, comprising:
  elongate projection portions projecting toward each other from the rib-shaped land portions adjacent to each other with one of the circumferential grooves therebetween, the elongate projection portions being formed in an annular shape extending in the tread circumferential direction;
  the elongate projection portions confronting each other are disposed with a spacing therebetween such that mutually confronting tip surfaces of the elongate projection portions make contact with each other through elastic deformation of the rib-shaped land portions at a time of grounding of the tire;
  the circumferential groove has formed therein with an inside groove space on a radially inner side of the confronting elongate projection portions, and with an outside groove space on a radially outer side of the confronting elongate projection portions;
  the confronting elongate projection portions have confronting tip surfaces thereof formed with a plurality of communication recesses providing communication between the outside groove space and the inside groove space, the communication recesses being formed at intervals in the tread circumferential direction;
  the elongate projection portions projecting from the rib-shaped land portions are formed to extend to the tip surfaces, respectively, in a form of a conical surface extending radially inward from tread surfaces on the rib-shaped land portions; and
  the elongate projection portions in the circumferential grooves on outermost areas in a tread width direction have a smaller inclination angle of the conical surface than an inclination angle of the conical surface of the elongate projection portions in the circumferential grooves in a central area in the tread width direction; the inclination angles being inclined with respect to the tread surfaces.

2. The pneumatic tire according to claim 1, wherein the communication recesses are formed rectilinearly while being oriented in the radial direction, respectively.

3. The pneumatic tire according to claim 1, wherein the mutually confronting tip surfaces of the confronting elongate projection portions are formed with the communication recesses in a mutually opposed manner.

4. The pneumatic tire according to claim 1, wherein the circumferential groove located in a central area with respect to the tread width direction has a greater number of the communication recesses formed in the elongate projection portions than the circumferential grooves provided in outermost areas with respect to the tread width direction.

5. A pneumatic tire formed with a plurality of rib-shaped land portions separated by circumferential grooves extending in a tread circumferential direction, comprising:
  elongate projection portions project toward each other from the rib-shaped land portions adjacent to each other with one of the circumferential grooves therebetween, the elongate projection portions being formed in an annular shape extending in the tread circumferential direction;
  the elongate projection portions confronting each other are disposed with a spacing therebetween such that mutually confronting tip surfaces of the elongate projection portions make contact with each other through elastic deformation of the rib-shaped land portions at a time of grounding of the tire;
  the circumferential groove has formed therein with an inside groove space on a radially inner side of the confronting elongate projection portions, and with an outside groove space on a radially outer side of the confronting elongate projection portions;
  the confronting elongate projection portions have confronting tip surfaces thereof formed with a plurality of communication recesses providing communication between the outside groove space and the inside groove space, the communication recesses being formed at intervals in the tread circumferential direction; and
  each of the communication recesses is formed rectilinearly while being oriented in a direction inclined relative to a radial direction, in such a manner that each communication recess has an inside opening communicating with the inside groove space and an outside opening communicating with the outside groove space, the outside opening being located at a position displaced relative to the inside opening in a tire rotational direction at a time of forward travel of a vehicle.

\* \* \* \* \*